US008521805B2

(12) United States Patent
Daimon (10) Patent No.: US 8,521,805 B2
(45) Date of Patent: Aug. 27, 2013

(54) INFORMATION PROCESSING APPARATUS AND COMPUTER READABLE MEDIUM

(75) Inventor: Kazuteru Daimon, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 616 days.

(21) Appl. No.: 12/209,006

(22) Filed: Sep. 11, 2008

(65) Prior Publication Data

US 2009/0193073 A1 Jul. 30, 2009

(30) Foreign Application Priority Data

Jan. 24, 2008 (JP) ................................. 2008-013631

(51) Int. Cl.
*G06F 15/16* (2006.01)
*H04L 29/08* (2006.01)

(52) U.S. Cl.
CPC ............................... *H04L 29/08072* (2013.01)
USPC ........................................................ 709/202

(58) Field of Classification Search
USPC ............... 709/201, 202, 203; 1/1; 455/414.1
See application file for complete search history.

(56) References Cited

U.S. PATENT DOCUMENTS

| 6,108,655 | A  | * | 8/2000  | Schleimer et al. ..................... 1/1 |
| 6,119,153 | A  | * | 9/2000  | Dujari et al. .................. 709/218 |
| 6,263,347 | B1 |   | 7/2001  | Kobayashi et al. |
| 6,532,481 | B1 | * | 3/2003  | Fassett, Jr. ............................. 1/1 |
| 7,318,073 | B2 | * | 1/2008  | Shields et al. ................. 707/621 |
| 7,519,916 | B1 | * | 4/2009  | Hartwell et al. .............. 715/771 |
| 7,574,486 | B1 | * | 8/2009  | Cheng et al. .................. 709/219 |
| 2002/0003535 | A1 | * | 1/2002 | Cho ............................... 345/204 |
| 2002/0194205 | A1 | * | 12/2002 | Brown et al. ................. 707/200 |
| 2004/0064834 | A1 | * | 4/2004  | Kuwata et al. .................. 725/86 |
| 2005/0203969 | A1 |   | 9/2005  | Kawabe |
| 2006/0271642 | A1 | * | 11/2006 | Stavrakos et al. ............. 709/217 |
| 2007/0016549 | A1 | * | 1/2007  | Whitcher ......................... 707/1 |
| 2008/0016184 | A1 | * | 1/2008  | Kanevsky et al. ............. 709/219 |
| 2009/0100454 | A1 | * | 4/2009  | Weber ............................... 725/9 |
| 2009/0125571 | A1 | * | 5/2009  | Kiilerich et al. .............. 707/204 |

FOREIGN PATENT DOCUMENTS

| JP | 10-333970    | A  | 12/1998 |
| JP | 11-232153    | A  | 8/1999  |
| JP |     3175692  | B2 | 4/2001  |
| JP | 2002-517818  | A  | 6/2002  |
| JP | 2005-259057  | A  | 9/2005  |
| WO | 99/63437     | A2 | 12/1999 |

OTHER PUBLICATIONS

Watanabe, Itaru, ZFS, JFS, FFS/FFFS/UFS2, ext3/ext4, ReiserFS/Reiser4, NTFS, Complete File System Book, UNIX Magazine, Japan, ASCII, Inc., Jan. 1, 2008, vol. 23, No. 1, p. 72-77.
Japanese Notice of Reasons for Refusal dated Nov. 10, 2009 in Japanese Patent Application No. 2008-013631.

* cited by examiner

*Primary Examiner* — Peter Shaw
(74) *Attorney, Agent, or Firm* — Sughrue Mion, PLLC (57) ABSTRACT

An information processing apparatus includes an output unit and a determining unit. The output unit outputs a piece of information relating to a piece of storage subject information stored in first storage unit into a source of request. The determining unit determines, at each piece of subject information, which to store the piece of storage subject information or a corresponding piece of alternative information into the source of request based on a predetermined condition. The corresponding piece of alternative information contains location information indicating a location of the piece of storage subject information in the first storage unit and has a size smaller than a size of the piece of storage subject information. And the output unit outputs the piece of storage subject information or the corresponding piece of alternative information into the source of request in accordance with a determination result by the determining unit.

16 Claims, 10 Drawing Sheets

| | | |
|---|---|---|
| SERVER | http://fujixxxxx.com/serverA/serverB/ | ~54 |
| CLIENT | D: ¥clientA ¥ clientB ¥ | ~55 |
| SYNCHRONOUS TIME | EVERYDAY 0 A.M. | ~56 |

SUMMARY OBTAINING CONDITION
- ☑ FILE SIZE — 100MB OR MORE
- OR
- ☐ EXTENSION
- OR
- ☑ CREATED DATE — ON OR BEFORE 12/31/1999
- OR
- ☐ UPDATED DATE

~57

☑ SYNCHRONIZE IMMEDIATELY
58

APPLY 59   CANCEL 60

| TEST DATA | 20XX/10/01 | 1GB |
|---|---|---|
| TEST RESULT | 20XX/10/01 | 1GB |
| TEST REPORT | 20XX/10/01 | 1MB |
| TOTALED RESULT | 20XX/10/01 | 1MB |
| ON-THE-SPOT PICTURE | 20XX/10/01 | 5MB |

INFORMATION PROCESSING APPARATUS AND COMPUTER READABLE MEDIUM

CROSS-REFERENCE TO RELATED APPLICATION

This application is based on and claims priority under 35 USC 119 from Japanese Patent Application No. 2008-013631 filed Jan. 24, 2008.

BACKGROUND

1. Technical Field

The present invention relates to an information processing apparatus and a computer readable medium.

2. Related Art

It is known that an information processing system which stores a part of file group (for example, a file group related to a particular folder) stored in a server into a client such as a personal computer so that a user of the client can use the file group stored in the server even in a state where the client can not communicate with the server. In the information processing system, there is a case that the size of electronic information such as the file group stored in the client becomes large.

SUMMARY

According to an aspect of the invention, an information processing apparatus includes an output unit and a determining unit. The output unit outputs a piece of information relating to a piece of storage subject information stored in first storage unit into a source of request. The determining unit, when the output unit outputs the piece of information relating to the piece of storage subject information into the source of request, determines, at each piece of subject information, which to store the piece of storage subject information or a corresponding piece of alternative information into the source of request based on a predetermined condition the corresponding piece of alternative information contains (i) location information indicating a location of the piece of storage subject information in the first storage unit and (ii) has a size smaller than a size of the piece of storage subject information. And the output unit outputs the piece of storage subject information or the corresponding piece of alternative information into the source of request in accordance with a determination result by the determining unit.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the invention will be explained with reference to drawings.

Figure 1:
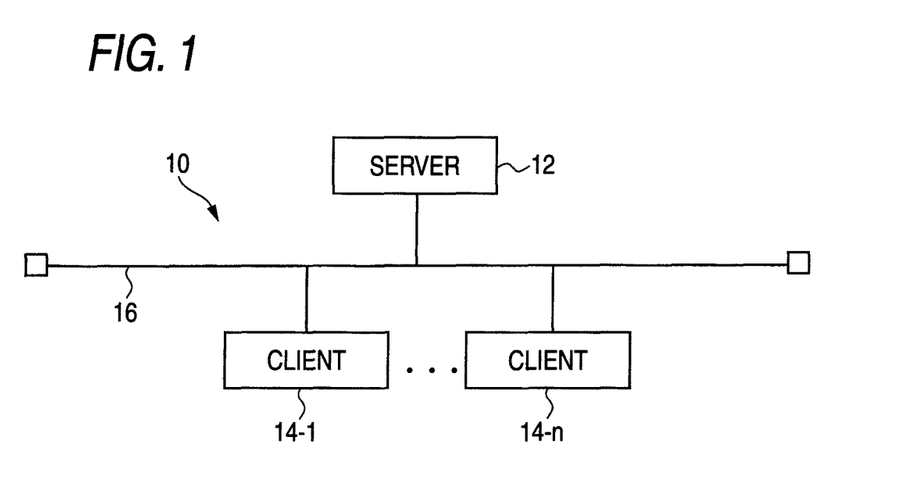
FIG. 1 is a diagram showing an example of the network configuration of an information processing system according to an exemplary embodiment of the invention.

As shown exemplarily the configuration of a network in FIG. 1, an information processing system 10 according to the exemplary embodiment is configured to include an information processing apparatus (server) 12 and plural user terminals (clients) 14 (14-1 to 14-n). The server 12 and the clients 14 are connected to a network 16 such as a local area network (LAN) so that the server 12 can communicate with the clients 14.

Figure 2:
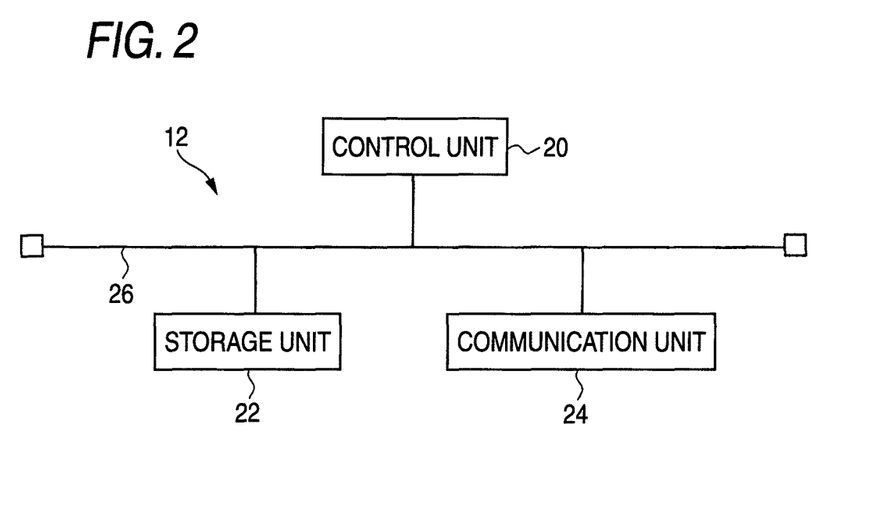
FIG. 2 is a diagram showing an example of the hardware configuration of a server according to the exemplary embodiment of the invention.

FIG. 2 is a diagram exemplarily showing the hardware configuration the server 12 in this exemplary embodiment.

The server 12 is configured to include a control unit 20, a storage unit 22 and a communication unit 24. The control unit 20 and the communication unit 24 are connected via a bus 26.

The control unit 20 is a program control device such as a CPU and is operated in accordance with a program installed in the server 12. The program can be stored in an information transmission medium such as a CD-ROM, a DVD-ROM capable of being read by a computer and can be supplied to the server 12 via an information transmission medium or a communication network such as an internet.

The storage unit 22 is a storage device such as an RAM or a hard disk. The storage unit 22 stores therein etc. a program executed by the control unit 20. Further, the storage unit 22 also operates as the working memory of the control unit 20.

Further, the storage unit 22 stores therein pieces of electronic information etc. such as files and folders as subjects to be copied into the clients 14.

The communication unit 24 is a network interface, for example, and transmits information to the clients 14 etc. via the network 16 in accordance with an instruction inputted from the control unit 20. Further, the communication unit 24 outputs information received via the network 16 to the control unit 20.

Each of the clients 14 exemplarily shown in FIG. 1 is configured by a known personal computer including a control device such as a CPU, a storage device such as a hard disk drive, an output device such as a display device, an input device such as a keyboard and a mouse, and a communication device such as a network interface, for example.

In each of the clients 14, a client program for copying the pieces of electronic information such as the files and folders stored in the storage unit 22 of the server 12 to the client 14 is installed. This program is supplied to the clients 14 via the information transmission medium such as a CD-ROM, a DVD-ROM capable of being read by the computer or the communication network such as the internet.

Next, the explanation will be made as to functions realized by the control unit 20 of the server 12. As exemplarily shown by a functional block diagram of FIG. 3, the control unit 20 of the server 12 functionally acts to have a storage control unit 30, a determining unit 32, an alternative information generation unit 34, a location information accepting unit 36, an alternative information replacing unit 38, an additional information changing accepting unit 40, an additional information changing unit 42, a condition accepting unit 44 and a condition changing unit 46.

Figure 3:
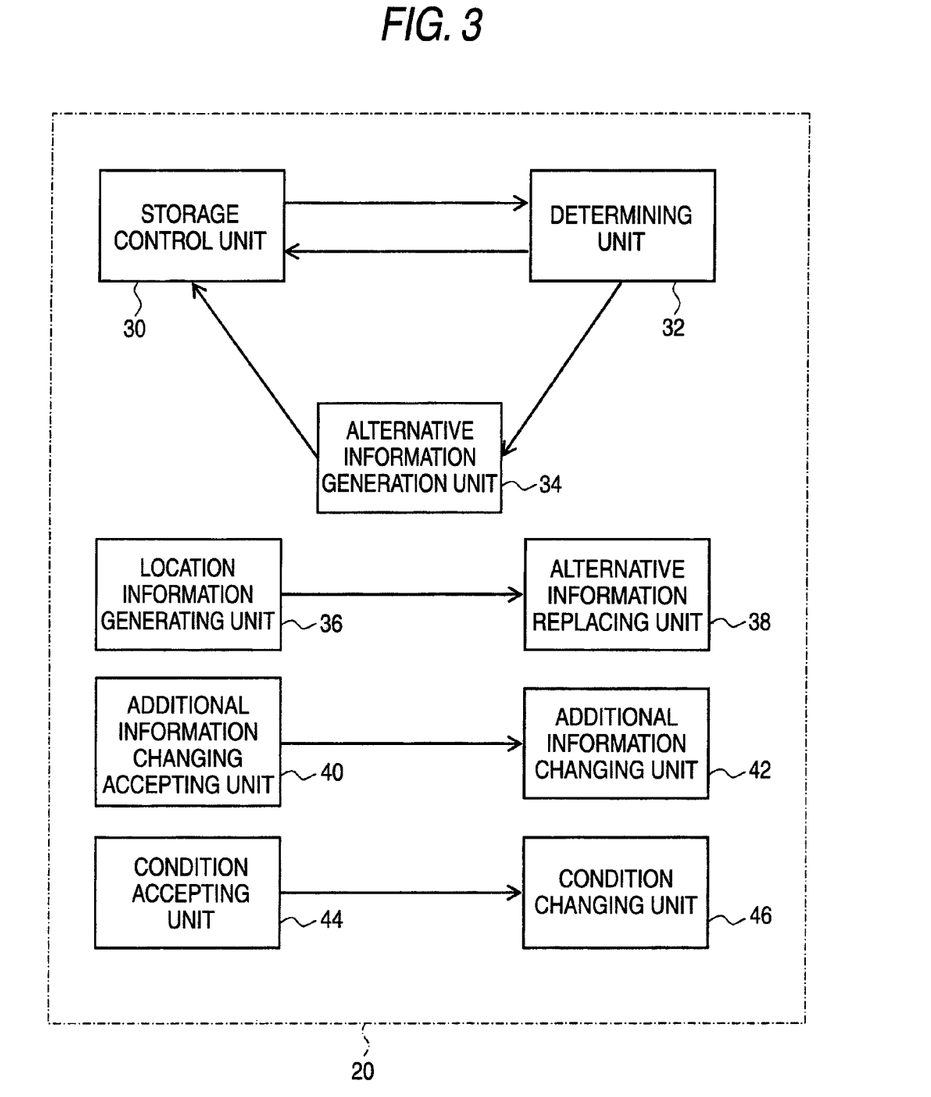
FIG. 3 is a diagram showing an example of the functional block diagram of the server according to the exemplary embodiment of the invention.

These units are realized when the control unit 20 such as the CPU of the server 12 executes the program installed in the server 12 as the computer.

The respective functions will be explained.

The storage control unit 30 controls the storing operation so as to store a piece of information relating to the piece of storage subject information (of course, the piece information may be the piece of storage subject information itself) stored in the storage unit 22 of the server 12 into the storage devices of the clients 14.

Specifically, the piece of storage subject information, for example, a piece of electronic information corresponding to a storage medium storing the information such as electronic information stored in the memory or the hard disk, or a piece of electronic information specified by the stored physical position such as a piece of electronic information stored in a particular drive within the hard disk, or a piece of electronic information specified by the stored logical position such as electronic information stored in a particular directory or folder. In this exemplary embodiment, the piece of storage subject information represents a file group managed in association with a particular folder, that is, file(s) as a subject to be stored within the particular folder.

Further, the piece of storage subject information (for example, the storage subject file) may be associated with a piece of additional information relating to the piece of storage subject information (for example, the storage subject file). Specifically, the piece of additional information indicates the attribute (for example, "a manual" in the case where the file is a manual document) of the piece of storage subject information (for example, the storage subject file) or a category representing a scene to be used (for example, "a test phase" in the case where the file is a test report), for example.

In the case where the storage control unit 30 controls the storing operation so as to store the piece of information relating to the piece of storage subject information stored in the storage unit 22 of the server 12 into the storage devices of the client 14, the determining unit 32 determines which to store the piece of storage subject information or the piece of alternative information based on a predetermined condition.

The piece of alternative information includes at least location information indicating the location of the piece of storage subject information in the storage unit 22 of the server 12. And the piece of alternative information has a smaller size than the piece of storage subject information.

Specifically, the piece of alternative information indicates (i) compressed information (for example, a compressed file) obtained by compressing the piece of storage subject information such as a file, or (ii) summary information (for example, a summary file) indicating the summary of the piece of storage subject information which indicates a document, a thumbnail or (iv) a part of a document (for example, a head page, an intermediate page or a last page of the document), for example.

The location information contained in the piece of alternative information indicates a path of a file as a subject to be stored or a URL, for example.

When the additional information is related to the piece of storage subject information, the alternative information may contain additional-information-changing-instruction information indicating the instruction of changing the additional information. The additional-information-changing-instruction information is information accepted by the additional information changing accepting unit 40. The details of the additional-information-changing-instruction information will be explained later.

Specifically, the condition (hereinafter called "an alternative determination condition") for determining whether or not the piece of alternative information is to be stored in the storage device of the client 14 is a condition specifying at least a part of the piece of the storage subject information such as (i) a size of information (more specifically, "a file larger than 100 MB"), (ii) a kind and an extension of information (more concretely, "a motion picture file" or "a file with an extension MPG"), (iii) prepared date/time or updated date/time of information (more specifically, "a file prepared in 2007").

Further, for example, when the version of the piece of storage subject information is managed, the determining unit 32 may determine based on the version of the piece of storage subject information whether or not the piece of alternative information is to be stored in the storage device of the client 14. More specifically, for example, when the piece of storage subject information is not the latest version, the determining unit 32 may determine that the piece of alternative information is to be stored in the storage device of the client 14.

The determining unit 32 may sequentially determine, as to each piece of storage subject information stored in the storage unit 22 of the server 12, whether or not the corresponding piece of alternative information is to be stored in the storage device of the client 14.

The alternative information generation unit 34 generates the piece of alternative information based on the piece of storage subject information. To be concrete, as explained above, the alternative information generation unit 34 generates the compressed information obtained by compressing the piece of storage subject information and the summary information (for example, a summary file) indicating the summary of the piece of storage subject information which indicates a document. The alternative information generation unit 34 generates the summary information by the known summary generation technique, for example.

Condition information indicating the alternative determination condition may be stored in a storage medium such as a memory or a hard disk. In this exemplary embodiment, the condition information is stored in the storage unit 22 of the server 12.

When the determining unit 32 determines that the piece of alternative information is to be stored in the storage device of the client 14 in place of storing the piece of storage subject information in the storage device of the client 14, the storage control unit 30 stores the piece of alternative information in the storage device of the client 14 in place of the piece of storage subject information.

The location information accepting unit 36 accepts from the client 14 the location information contained in the piece of alternative information stored in the storage device of the client 14.

The alternative information replacing unit 38 replaces the piece of alternative information containing the location information accepted by the location information accepting unit 36 with the piece of storage subject information specified by the location represented by the location information accepted by the location information accepting unit 36. Specifically, for example, the alternative information containing a URL as a summary is replaced by a file specified by the URL.

The additional information changing accepting unit 40 accepts the additional-information-changing-instruction information when the piece of alternative information contains the additional-information-changing-instruction information. Specifically, for example, when the piece of alternative information contains the additional information, the additional information changing accepting unit 40 accepts a changing request of the additional information related to the piece of storage subject information which is (i) stored in the storage unit 22 of the server 12 and (ii) specified by the location information (for example, a URL) contained in the piece of alternative information.

Then, the additional information changing unit 42 changes the additional information in accordance with the changing instruction of the additional information indicated by the additional-information-changing-instruction information which is accepted by the additional information changing accepting unit 40.

The condition accepting unit 44 accepts a condition for determining whether or not the piece of alternative information is to be stored in the storage device of the client 14.

The condition changing unit 46 changes the condition information indicating the predetermined condition stored in the storage unit 22 of the server 12 into the condition accepted by the condition accepting unit 44.

The details of the processings performed by the condition accepting unit 44 and the condition changing unit 46 will be described later.

Next, as a specific example of the processings executed by the server 12 and the client 14 in the case where a user of the information processing system 10 performs a setting in order to store the file group (storage subject files) stored in the storage unit 22 of the server 12 into the storage device of the client 14, the explanation will be made as to an example of the flow of the processing for performing a setting in order to store the piece(s) of storage subject file stored in a particular folder of the server 12 into a particular folder of the client 14.

Figure 4:
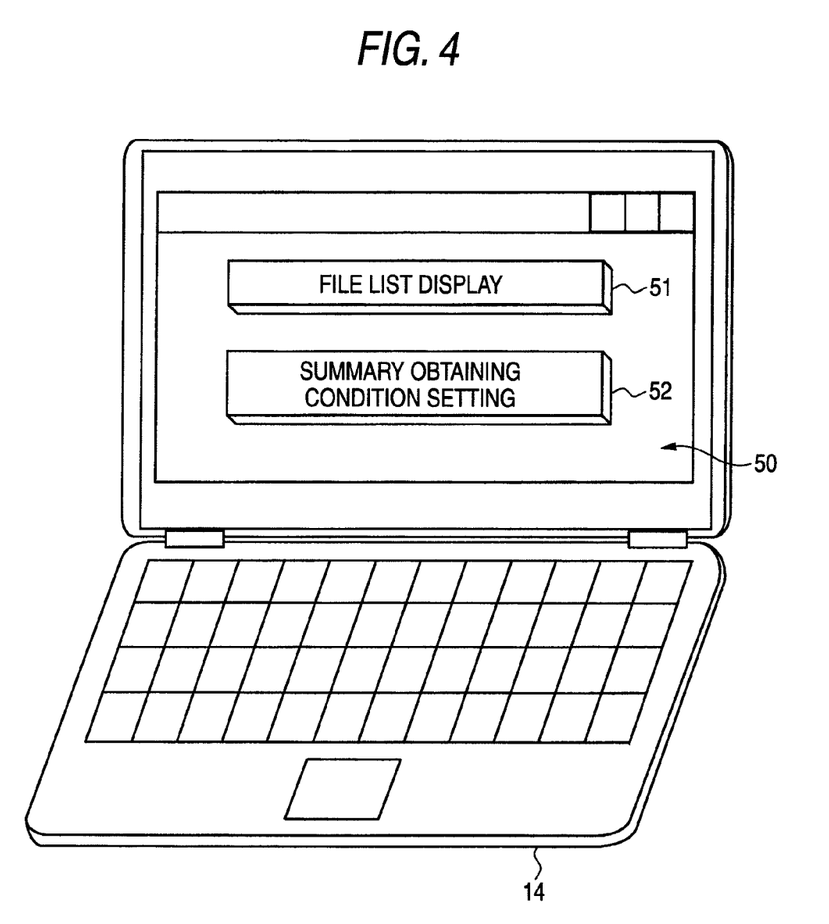
FIG. 4 is a diagram showing an example of a client which menu screen is displayed on an output device such as a display device.

Firstly, when the user of the information processing system 10 executes the client program in the client 14, the control device of the controller 14 outputs a menu screen 50 shown in FIG. 4 as an example to the output device such as a display device of the client 14. The menu screen 50 includes a file list display button 51 and a summary obtaining condition setting button 52.

Figure 5:
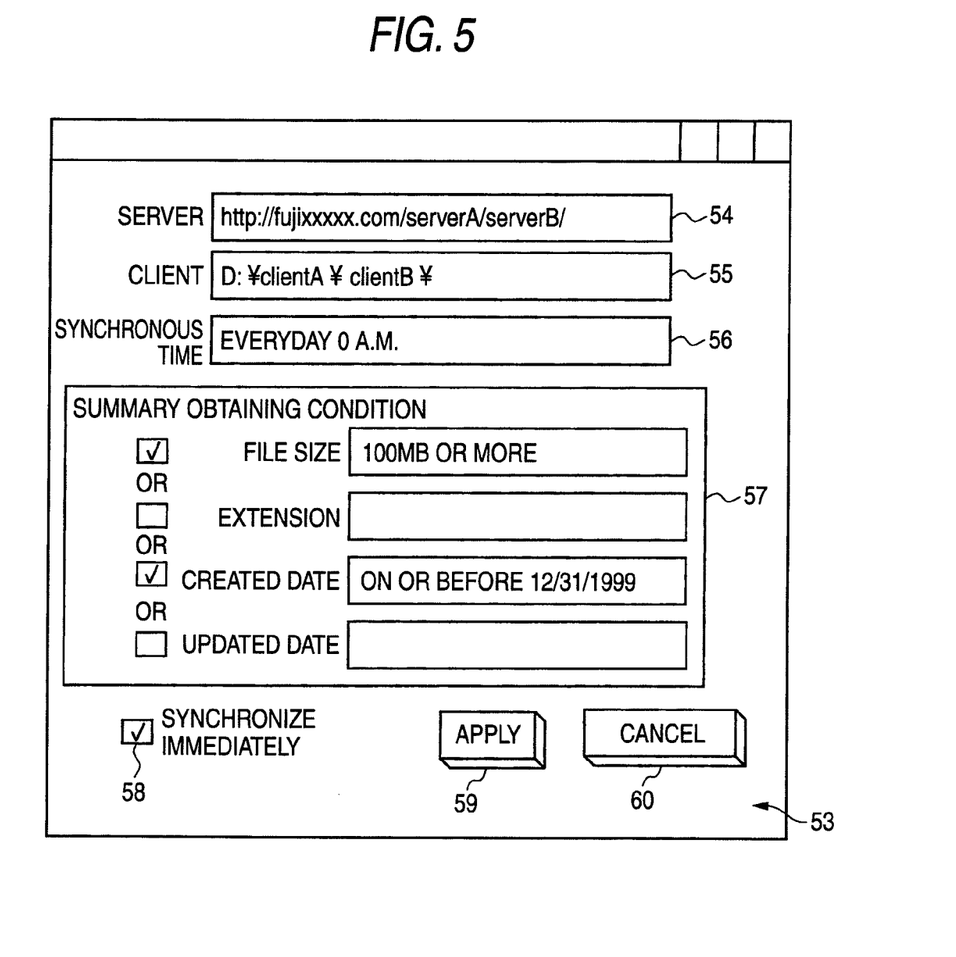
FIG. 5 is a diagram showing an example of a summary obtaining condition setting screen.

When the user of the information processing system 10 clicks (presses) the summary obtaining condition setting button 52, the control device of the controller 14 outputs a summary obtaining condition setting screen 53 shown in FIG. 5 as an example to the output device such as the display device of the client 14 like the menu screen 50 shown in FIG. 4 as an example. The summary obtaining condition setting screen 53 includes a server position designation form 54, a client position designation form 55, a synchronous time designation form 56, a summary obtaining condition designation form 57, an immediate synchronous check box 58, an application button 59 and a cancel button 60.

A user inputs in the server position designation form 54 the position of a folder (for example, the folder in which a storage subject file is stored) associated with the storage subject file to be stored in the client 14 from the server 12. Specifically, for example, the user inputs in the server position designation form 54 an URL (for example, "http://fujixxxxx.com/serverA/serverB/" as shown in FIG. 5 as an example) or a path representing a folder where the storage subject file is stored.

Then, the user inputs in the client position designation form 55 the position of the folder (URL or path) of the client 14 for storing the file stored at the position designated by the server position designation form 54. Specifically, for example, "D:¥clientA¥clientB¥" is inputted as shown in FIG. 5 as an example.

Then, the user inputs into the synchronous time designation form 56 a time (hereinafter called "synchronous time") at which the server 12 stores the storage subject file into the storage device of the client 14. Specifically, the user inputs "everyday at 0 a.m." as an example.

Then, the user inputs a summary obtaining condition as an example of the alternative determination condition into the summary obtaining condition designation form 57. The summary obtaining condition represents a condition for determining whether or not a summary file is to be stored in the storage device of the client 14, that is, a condition which specifies a storage subject file in order to store the summary file into the storage device of the client 14 in place of the storage subject file. Specifically, for example, the user inputs in the summary obtaining condition designation form 57, conditions such as "file size", "extension", "created date" and "updated date".

In this exemplary embodiment, as shown in FIG. 5 as an example, the user inputs into the summary obtaining condition designation form 57, the condition that the file size is "100 MB or more" or the created date is "on or before Dec. 31, 1999".

The "file size", "extension", "created date" and "updated date" are mere example of the summary obtaining condition. The user may input other conditions into the summary obtaining condition designation form 57 as the summary obtaining condition.

The method of setting the alternative determination condition (summary obtaining condition) is not limited to the aforesaid one. Specifically, for example, the user may input into the summary obtaining condition designation form 57, a condition specifying a storage subject file corresponding to a summary file which the storage control unit 30 doesn't store into the storage device of the client 14. Further, the apparatus may be arranged in a manner that the user inputs into the summary obtaining condition designation form 57 (i) a condition specifying a storage subject file corresponding to the summary file which the storage control unit 30 stores into the storage device of the client 14 in place of the storage subject file and (ii) a condition specifying a storage subject file itself which the storage control unit 30 stores into the storage device of the client 14.

Then, when a user clicks the application button 59, the client 14 transmits to the server 12 synchronous setting information containing server position information, client position information and summary obtaining condition information. As clear from that the synchronous setting information contains the summary obtaining condition information, the synchronous setting information is one of the specific examples of the condition information explained above.

The server position information is, for example, information representing a character sequence (for example, a character sequence of "http://fujixxxxx.com/serverA/serverB/") inputted into the server position designation form 54. The client position information is, for example, information representing a character sequence (for example, a character sequence of "D:¥clientA¥clientB¥") inputted into the client position designation form 55. Further, the summary obtaining condition information is, for example, information representing a condition generated based on the information inputted into the summary obtaining condition designation form 57. Specifically, for example, the information representing the condition that the file size is "100 MB or more" or the created date is "on or before Dec. 31, 1999".

Then, the condition accepting unit 44 of the server 12 accepts the synchronous setting information transmitted from the client 14. Then, the condition changing unit 46 outputs the synchronous setting information thus accepted to the storage unit 22 of the server 12. In this case, when the synchronous setting information has been already stored in the storage unit 22, the condition changing unit 46 replaces the synchronous setting information having been stored in the storage unit 22 with the synchronous setting information accepted by the condition accepting unit 44.

The client 14 outputs the client position information and synchronous time information representing a synchronous time to the storage device of the client 14.

When the user clicks the cancel button 60, the client 14 outputs the menu screen 50 shown in FIG. 4 as an example to the output device such as the display device of the client 14.

When the user checks the immediate synchronous check box 58 and then clicks the application button 59 on the summary obtaining condition setting screen 53, the client transmits to the server 12, synchronous instruction information for instructing the server 12 to store the file stored in the storage unit 22 of the server 12 into the storage device of the client 14 as well as the synchronous setting information.

Then, the storage control unit 30 accepts the synchronous instruction information and stores the file stored in the storage unit 22 of the server 12 into the storage device of the client 14. The contents of the processing for storing the file stored in the storage unit 22 of the server 12 into the storage device of the client will be described later.

The method of performing at the server 12 the setting for storing the file group stored in the storage unit 22 of the server 12 into the storage device of the client is not limited to the aforesaid one.

Specifically, for example, the summary obtaining condition setting screen 53 may include synchronous interval designation form in place of the synchronous time designation form 56, and the user may set a time interval (for example, 24 hour) for storing the file stored in the storage unit 22 of the server 12 into the storage device of the client 14 in the synchronous interval designation form.

Next, as an specific example of the flow of the processing performed by the server 12 at the time of storing the storage subject file stored in the storage unit 22 of the server 12 into the storage device of the client 14, the explanation will be made with reference to flow charts shown in FIGS. 6 and 7 as an example with respect to an specific example of the flow of the processing performed by the server 12 at the time of storing the storage subject file stored in folder (for example, a folder specified by the URL "http://fujixxxxx.com/serverA/serverB/", hereinafter called "a server side folder") of the server 12 into the folder (for example, a folder specified by the path "D:¥clientA¥clientB¥", hereinafter called "a client side folder") of the client 14 specified by the client position information.

Figure 6:
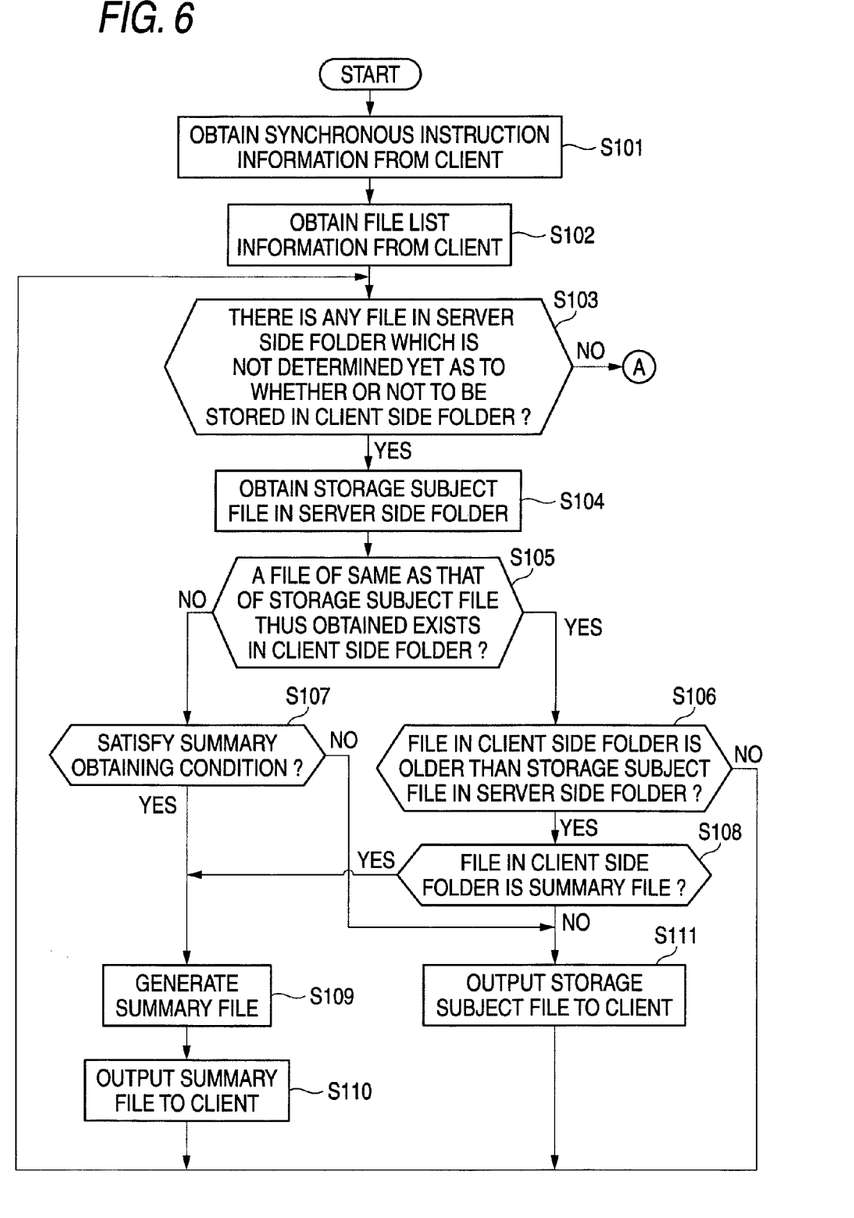
FIG. 6 is a diagram showing an example of a flow chart of the processing performed in the information processing system.
Figure 7:
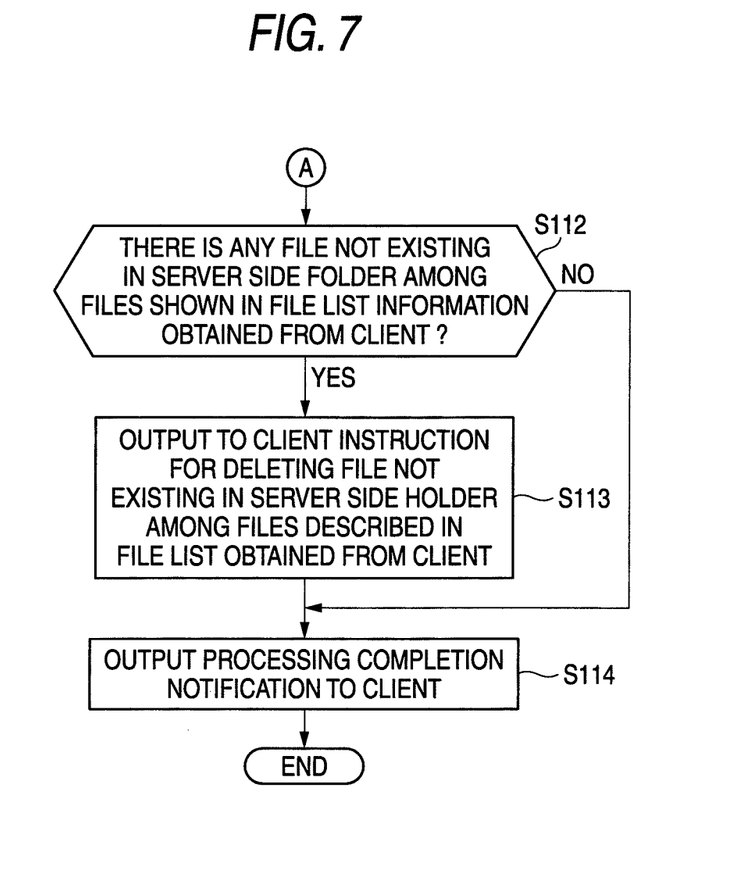
FIG. 7 is a diagram showing an example of a flow chart of the processing performed in the information processing system.

The flow charts shown in FIGS. 6 and 7 represent an example of the flow of the processing of the server 12 at the time of storing the storage subject file in the server side folder into the client side folder.

When the current time becomes a synchronous time (to be concrete, for example, everyday at 0 a.m.), indicated by the synchronous time information stored in the storage device of the client 14, the client 14 transmits the synchronous instruction information to the server 12.

Then, the storage control unit 30 of the server 12 obtains the synchronous instruction information transmitted from the client 14 (S101).

Then, the client 14 transmits to the server 12 the file list information showing the list of the files in the folder (in this case, a folder specified by the path "D:¥clientA¥clientB¥"), that is, the client side folder indicated by the client position information stored in the storage device of the client 14.

Figure 8:
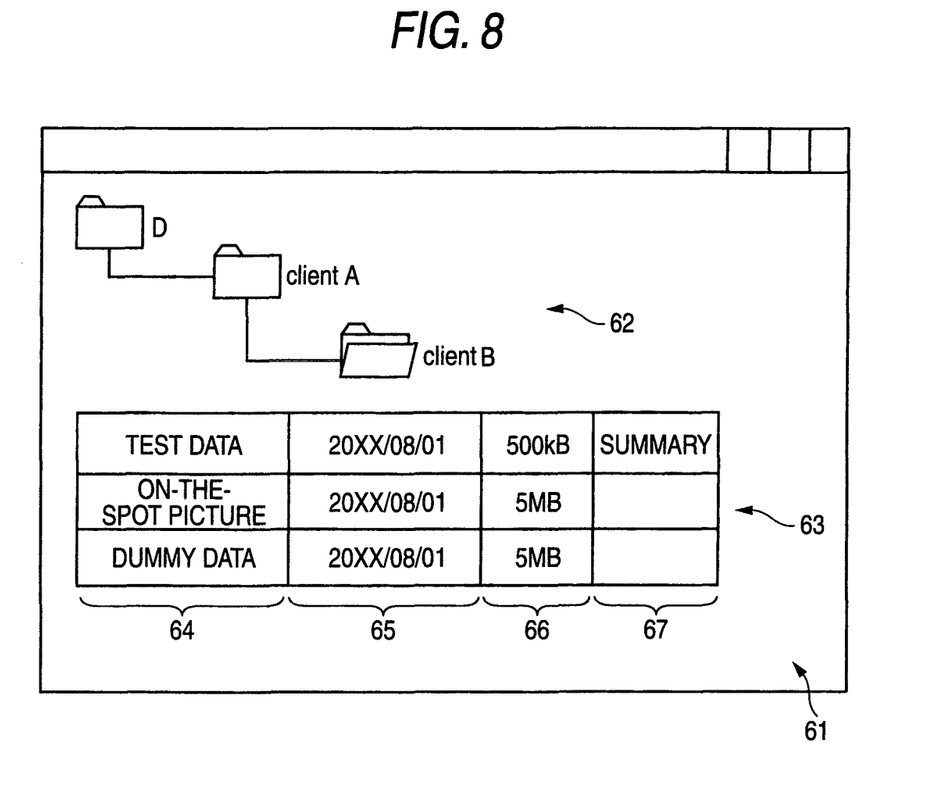
FIG. 8 is a diagram showing an example of a file list display screen.

FIG. 8 is a diagram showing an example a file list screen 61 to be outputted to the output device such as the display device of the client 14 from the control device of the client 14 when the user clicks the file list display button 51 on the menu screen 50 shown in FIG. 3 as an example. As shown in FIG. 8 as an example, the file list screen 61 contains a folder tree display section 62 and a file list display section 62. The folder tree display section 62 contains a folder icon showing the folder.

FIG. 8 shows an example of the file list screen 61 in the case where a user clicks an icon representing a folder specified by the path "D:¥clientA¥clientB¥" displayed at the folder tree display section 62. The file list display section 62 displays a file name information 64 representing file names of three files within the client side folder specified by the path "D:¥clientA¥clientB¥", a created date information 65 indicating created dates of these files, a size information 66 indicating sizes of these files and summary index information 67 indicating whether or not each of these files is the summary file. As to a file represented as "summary" as the summary index information 67, not the file itself but a summary file containing the summary of the file is stored in the client side folder.

Specifically, for example, as shown in FIG. 8 as an example, as to the file which file name is "test data", a summary file thereof is stored in the client side folder.

In this exemplary embodiment, the client 14 transmits to the server 12 the file list information containing at least the file name information 64 and the summary index information 67 of the three files shown in FIG. 8 as an example.

Then, the storage control unit 30 of the server 12 obtains the file list information transmitted from the client 14 (S102).

Then, the storage control unit 30 of the server 12 determines, based on the server position information contained in the synchronous setting information stored in the storage unit 22 of the server 12, whether or not there remains any file, in the folder specified by the URL "http://fujixxxxx.com/serverA/serverB/", that is, the server side folder, which is not determined yet as to whether or not to be stored in the client side folder (S103).

When there remains any file which is not determined yet as to whether or not to be stored in the client side folder (Yes in S103), the storage control unit 30 obtains a storage subject file which is not determined yet as to whether or not to be stored in the client side folder (S104).

Then, the storage control unit 30 confirms with reference to the file list information whether or not a file of the same name as that of the storage subject file exists in the client side folder (S105).

Figure 9:
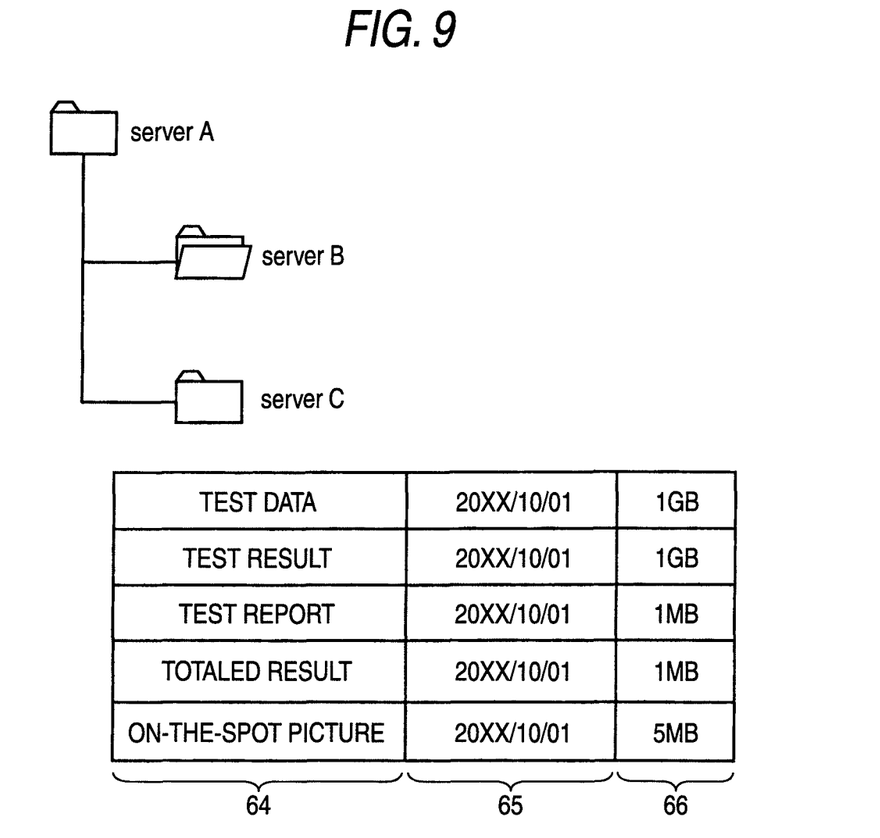
FIG. 9 is a schematic diagram showing an example of a storage subject file contained in a server side holder.

FIG. 9 is a schematic diagram showing an example of the storage subject files contained in the server side folder. FIG. 9 shows the file name information 64 indicating the file names of the storage subject files, the created date information 65 indicating the created dates of the storage subject files and the size information 66 indicating the sizes of the storage subject files.

As shown in FIG. 9 as an example, the storage subject file having the file name "test data" and the storage subject file having the file name "on-the-spot picture" correspond to the file names contained in the file list information obtained by the server 12. That is, the files having the same names as these files exist in the client side folder.

When there is a file of the same name as that of the storage subject file in the client side folder (Yes in S105), it is confirmed whether or not the file of the same name as that of the storage subject file in the client side folder is older than the storage subject file in the server side folder (S106).

When there is no file of the same name as that of the storage subject file in the client side folder (No in S105) it is confirmed whether or not the storage subject file satisfies a condition shown by the summary obtaining condition information contained in the synchronous setting information stored in the storage unit 22 of the server 12 (S107).

In the processing shown in S106 as an example, when the file stored in the client side folder is older than the storage subject file stored in the server side folder (Yes in S106), it is confirmed whether or not the file stored in the client side folder is a summary file (S108).

When the file stored in the client side folder is a summary file (Yes in S108), the alternative information generation unit 34 generates a summary file based on the storage subject file stored in the server side folder (S109). The summary file contains the location information indicating the location of the storage subject in the server side folder.

In the processing shown in S107 as an example, also in the case where the storage subject file satisfies the condition represented by the summary obtaining condition information (Yes in S107), the alternative information generation unit 34 generates a summary file based on the storage subject file stored in the server side folder (S109).

Then, the storage control unit 30 outputs the summary file generated in the processing shown in S109 as an example to the client 14 (S110). Then, the client 14 obtains the summary file and stores it in the client side holder.

In the processing shown in S108 as an example, when the file stored in the client side folder is not a summary file (No in S108), the storage control unit 30 outputs the storage subject file itself to the client (S111). In the processing shown in S107 as an example, also in the case where the storage subject file does not satisfy the condition represented by the summary obtaining condition information, the storage control unit 30 outputs the storage subject file itself to the client side folder.

When the processing shown in S110 as an example or the processing shown in S111 as an example completes, the storage control unit 30 again confirms whether or not there remains any file, in the folder of the server 12 represented by the server position information, which is not determined yet as to whether or not to be stored in the client side folder (S103). Further, in the processing shown in S106 as an example, when the file stored in the client side folder is newer than the storage subject file stored in the server side folder (No in S106), the storage control unit 30 again confirms whether or not there remains any file, in the folder of the server 12 represented by the server position information, which is not determined yet as to whether or not to be stored in the client side folder (S103).

In this exemplary embodiment, as to each of the files with the file names "test data" and "on-the-spot picture", the files of the client side folder are older than the files of the server side holder. With respect to the file with the file names "test data", the file stored in the client side holder is a summary file.

Thus, as to the file with the file name "test data", the storage control unit 30 generates a summary file and outputs it to the client 14. On the other hand, as to the file with the file name "on-the-spot picture", since the file in the client side holder is not a summary file, the storage control unit 30 does not generate a summary file but outputs the storage subject file itself to the client 14.

In this manner, when there has been a case that the server 12 stores the piece of storage subject information (storage subject file) in the storage device (client side holder) of the client 14 from the storage unit 22 (server side holder) of the server 12, the determining unit 32 may determine to store the piece of storage subject information (storage subject file) in the client side holder among the piece of storage subject information (storage subject file) and the alternative information (summary file).

In the processing shown in S108 as an example, the determining method performed by the determining unit 32 is not limited to the aforesaid example. For example, a table showing a list of the piece of storage subject information (storage subject files) having been stored in the storage device (client side holder) of the client 14 from the storage unit 22 (server side holder) of the server 12 by the server 12 is stored in the storage unit 22 of the server 12. Then, the determining unit 32 may determine with reference to the table whether or not the server 12 has stored the piece of storage subject information (storage subject file) in the storage device (client side holder) of the client 14 from the storage unit 22 (server side holder) of the server 12.

Further, the storage control unit 30 may overwrite the files with the file names "test data" and "on-the-spot picture" in the client side holder. That is, in the case where the storage control unit 30 performs the storage control so as to store the piece of storage subject information stored in the storage unit 22 of the server 12 into the storage device of the client 14, if the piece of alternative information containing the location information indicating the location of this piece of storage subject information is stored in the storage device of the client 14, the storage control unit 30 may perform the storage control so as to store the piece of storage subject information in place of the piece of alternative information.

As to the files with the file names "test result", "test report" and "totaled result" among the storage subject files of the server side holder, files with the same names as those files do not exist in the client side holder. As shown in FIG. 9 as an example, the file with the file name "test result" satisfies the condition "the file size is "100 MB or more".

Thus, as to the file with the file names "test result", a summary file is generated and outputted to the client 14. On the other hand, as to each of the files with the file names "test report" and "totaled result", a summary file is not generated but the storage subject file itself in the server side holder is outputted to the client 14.

In the processing shown in S103 as an example, when there does not remain any file which is not determined yet as to whether or not to be stored in the client side folder (No in S103), it is confirmed with reference to the file list information whether or not there is any file not existing in the server side folder of the storage unit 22 of the server 12 among the files shown in the file list information (S112).

When there is a file not existing in the server side folder among the files shown in the file list information (Yes in S112), the storage control unit 30 outputs to the client 14, an instruction for deleting the file from the client 14 (S113).

In this exemplary embodiment, since the file with the file name "dummy data" does not exist in the server side holder, the storage control unit 30 outputs to the client 14, an instruction for deleting this file from the client 14. Then, the client 14 accepts the instruction from the server 12 and deletes the file with the file name "dummy data" in the client side holder.

Then, when the processing shown in S103 as an example is completed or when, in the processing shown in S112 as an example, it is confirmed that there is not any storage subject file not stored in the server side folder (No in S112), the storage control unit 14 outputs to the client 14, a processing completion notification indicating that the processings is completed (S114) to thereby terminate the processings.

Figure 10:
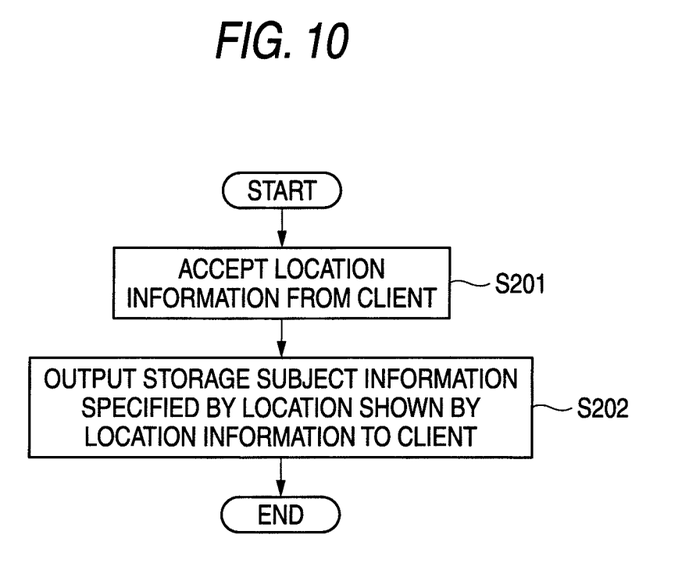
FIG. 10 is a diagram showing an example of a flow chart of the processing performed in the information processing system.

Next, the explanation will be made with reference to a flow chart shown in FIG. 10 as an example as to an example of a flow of the processing in which the server 12 stores the storage subject file in the server side holder corresponding to the summary file in the client side holder in response to the request from the client 14. In this exemplary embodiment, the storage subject file is related to additional information such as "title", "abstract", "creating person", "created date", "updated date", "size" and "category".

When the file name is clicked in the file list screen 61 shown in FIG. 8 as an example, the control device of the client 14 outputs an additional information screen 68 shown in FIG. 11 as an example as to the file of the clicked file name (hereinafter called "a download subject file") to the output device such as the display device of the client 14 as a screen provided separately from the file list screen 61.

The additional information screen 68 includes a title form 69, an abstract form 70, a creating person display section 71, a created date display section 72, an updated date display section 73, a size display section 74, a category form 75, an additional information update button 76, a storage subject file download button 77 and a close button 78. The tile form 69 shows the title of a download subject file. The abstract form 70 shows the abstract of the download subject file. The prepared person display section 71 shows a name of the creating person of the download subject file. The created date display section 72 shows the created date of the download subject file. The updated date display section 73 shows the updated date of the download subject file. The size display section 74 shows the size of the download subject file. The category form 75 shows the category of the download subject file.

The control device of the client 14 may obtain a summary file stored in the client side holder or the additional information from the download subject file and output it to the additional information screen 68. Alternatively, the control device of the client 14 may transmit an additional information obtaining request to the sever 12 and obtain the additional information of the storage subject file stored in the server side holder transmitted from the server 12 to thereby output to the additional information screen 68.

When the download subject file is a summary file, the storage subject file download button 77 is placed in a state capable of being clicked by a user.

In the case where the download subject file is a summary file, when a user clicks the storage subject file download button 77, the client 14 transmits to the server 12 the location information of the file in the server 12. Specific, for example, the client transmits a URL "http://fujixxxxx.com/serverA/serverB/testdata" to the server 12. Then, the location information accepting unit 36 of the server 12 accepts the location information transmitted from the client 14 (S201).

Then, the alternative information replacing unit 38 obtains the piece of storage subject information specified by the location (for example, "http://fujixxxxx.com/serverA/serverB/testdata") shown by the location information from the storage unit 22 of the server 12 and outputs the piece of storage subject information to the client (S202). The, the client 14 replaces the piece of alternative information by the piece of storage subject information outputted from the server 12.

When a user clicks the close button 78, the control device of the client 14 clears the additional information screen 68 from the output device such as the display device of the client 14.

Next, the explanation will be made as to an example of a flow of the processing for changing the additional information of the storage subject file stored in the storage unit 22 of the server 12.

Figure 11:
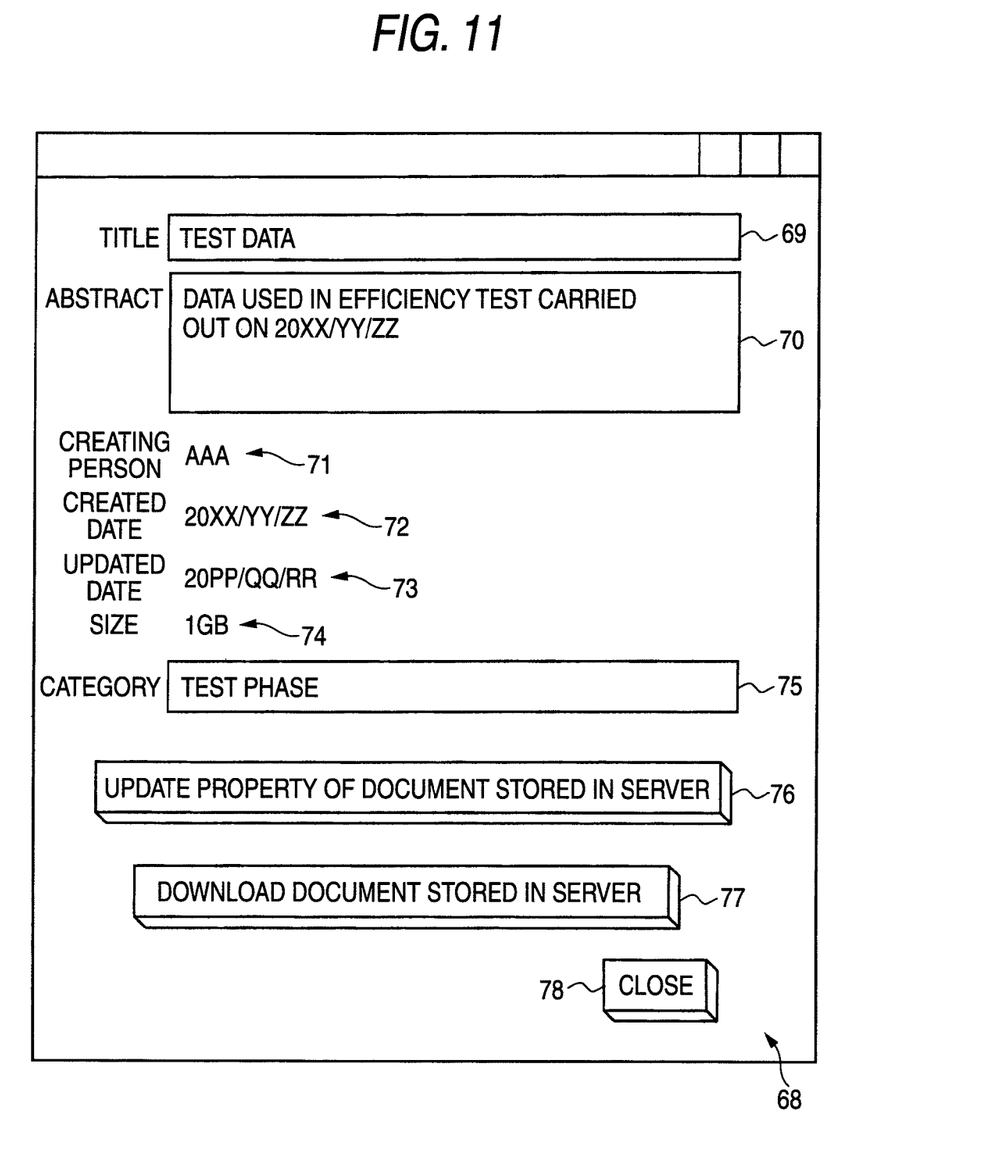
FIG. 11 is a diagram showing an example of an additional information screen.

In the additional information screen 68 shown in FIG. 11, for example, when a user overwrites a character sequence "single test phase" in the category form 75 and clicks the additional information update button 76, the client 14 transmits to the server 12 information showing an instruction for changing the additional information showing the category of the piece of storage subject information specified by the location (for example, URL "http://fujixxxxx.com/serverA/serverB/testdata") shown by the location information to "single test phase" from "test phase". Then, the additional information changing accepting unit 40 of the server 12 accepts the information showing the instruction of changing the additional information. Thus, the additional information changing unit 42 changes the additional information showing the category of the piece of storage subject information specified by the location (for example, "http://fujixxxxx.com/serverA/serverB/testdata") shown by the location information to "single test phase" from "test phase".

The invention is not limited to the aforesaid exemplary embodiment.

For example, the function of the storage control unit 30 realized by the server 12 is not limited to the function (so called "a synchronous function") for performing the storage control so as to store the piece of storage subject information stored in the storage unit 22 of the server 12 into the storage device of the client 14 in accordance with a predetermined schedule such as the set "synchronous time". For example, the function of the storage control unit 30 may be modified so as to perform the storage control in a manner that the piece of storage subject information stored in the storage unit 22 of the server 12 is sequentially stored in the storage device of the client 14 in accordance with a request of a user.

Further, there may be an exemplary embodiment which does not include any of the condition accepting unit 44 and the alternative information replacing unit 38. Further, there may be an exemplary embodiment which does not include any of the additional information changing accepting unit 40 and the additional information changing unit 42. Furthermore, there may be an exemplary embodiment which does not include any of the condition accepting unit 44 and the condition changing unit 46.

The server 12 does not need to store the condition information such as the synchronous setting information in the storage unit 22 of the server 12. For example, each time the storage control unit 30 of the server 12 stores the storage subject file stored in the storage unit 22 of the server 12 into the storage device of the client 14, the condition accepting unit 44 of the server 12 may accept the condition information from the client 14, and the determining unit 32 may determine based on the condition information accepted by the condition accepting unit 44 whether or not the piece of alternative information is to be stored in the storage device of the client 14.

Further, the server 12 may store the synchronous time information into the storage unit 22 of the server 12 and the storage control unit 30 may store the piece of storage subject information stored in the storage unit 22 of the server 12 into the storage device of the client 14 based on a time represented by the synchronous time information.

Further, the server 12 may has a function of generating the piece of storage subject information based on the piece of alternative information.

Further, the electronic information such as the condition information is not necessarily stored in the storage unit 22 of the server 12 or the storage device of the client but may be stored any kind of storage unit.

Further, the information processing system 10 may not be configured by the server 12 and the client 14 but may be configured by a single information processing device. Furthermore, the number of the server 12 is not limited to one and a plurality of the servers may be provided.

Further, the piece of alternative information stored in the storage device of the client 14 having obtained the alternative information may be moved to another client 14. In this case, the client 14 to which the piece of alternative information is moved may be arranged to be able to obtain the piece of storage subject information which is specified by the location represented by the location information contained in the alternative information.

Like not only the case of storing the piece of storage subject information stored in the storage unit 22 of the server 12 into the storage device of the client but also the case of storing the piece of storage subject information stored in the storage device of the client 14 into the storage unit 22 of the server 12, the invention may be generally applied to a case of storing the piece of storage subject information stored in a first storage device into a second storage device.

Further, the invention may be applied to a distributed information processing system in which the storage unit of the server 12 and the storage device of the client 14 are provided in another computer provided outside of the information processing system 10 so as to communicate with the server 12 and the client 14.

Although in the aforesaid exemplary embodiment, a file is raised as an example of the piece of storage subject information, the invention may be applied to the piece of storage subject information other than a file.

Further, the invention is not limited to the aforesaid exemplary embodiment as to the role allocation between the server 12 and the client 14 and the mounting method of the information processing program.

The concrete numerical values and concrete character sequences such as a URL and a path described in the specification are mere examples and so the invention is not limited to those numerical values and character sequences.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer-readable recording medium storing a program that causes a server to execute a method of synchronizing a file stored on the server to a client, the method comprising:

receiving from the client a request to synchronize the file to the client, the request comprising a location at which the file is stored on the server, a location on the client at which the file is to be stored, a list of files stored at the location on the client, and a file synchronizing condition for determining whether the server is (1) to transfer the file or (2) to transfer alternative information instead of transferring the file, wherein the file synchronizing condition comprises at least one of a maximum size of the file, a type of the file, a creation date of the file, and an updated date of the file;

determining that the file is stored at the location on the client based on the list of files;

comparing the file stored at the location on the client to the file stored on the server, wherein the comparing comprises comparing a version of the file stored at the location on the client to a version of the file stored on the server;

determining, based on the at least one of the maximum size of the file, the type of the file, the creation date of the file, and the updated date of the file indicated by file synchronizing condition received in the request, whether the at least one of the maximum size of the file, the type of the file, the creation date of the file, and the updated date of the file satisfies the file synchronizing condition;

determining that the server is (1) to transfer the file in response to determining that the at least one of the maximum size of the file, the type of the file, the creation date of the file, and the updated date of the file satisfies the file synchronizing condition or (2) to transfer the alternative information instead of transferring the file in response to determining the at least one of the maximum size of the file, the type of the file, the creation date of the file, and the updated date of the file does not satisfy the file synchronizing condition and based on the file synchronizing condition received in the request, to transfer to the client the alternative information in place of the file, in response to a result of the comparing that indicates the version of the file stored at the location on the client is older than the version of the file stored on the server; and transferring to the client one of the file or the alternative information based on a result of the determining.

2. The non-transitory computer-readable medium according to claim 1, wherein the alternative information comprises a compressed file of the file.

3. The non-transitory computer-readable medium according to claim 1, wherein the file comprises a document and the alternative information comprises a summary file of the document.

4. The non-transitory computer-readable medium according to claim 1, wherein the file comprises an image file and the alternative information comprises a thumbnail image of the image file.

5. The non-transitory computer-readable medium according to claim 1, wherein the alternative information comprises a portion of the file that is less than the entire file.

6. The non-transitory computer-readable medium according to claim 5, wherein the file comprises a document and the portion of the file comprises a page of the document.

7. The non-transitory computer-readable medium according to claim 6, wherein the page of the document comprises one of a first page of the document, an intermediate page of the document, and a last page of the document.

8. The non-transitory computer-readable medium according to claim 1, wherein the alternative information comprises an alternative file in place of the file and a location of the file stored on the server.

9. The non-transitory computer-readable medium according to claim 8, wherein the location comprises a uniform resource locator (URL).

10. The non-transitory computer-readable medium according to claim 1, wherein the file synchronizing condition comprises a maximum size of the file,
   wherein the determining comprises determining that a size of the file exceeds the maximum size of the file, and
   wherein the transferring comprises transferring to the client the alternative information in place of the file in response to determining that the size of the file exceeds the maximum size of the file.

11. The non-transitory computer-readable medium according to claim 1, wherein the file synchronizing condition comprises an indicated type of the file,
   wherein the determining comprises determining that a type of the file matches the indicated type of the file, and
   wherein the transferring comprises transferring to the client the alternative information in place of the file in response to determining that the type of the file matches the indicated type of the file.

12. The non-transitory computer-readable medium according to claim 11, wherein the indicated type of the file comprises a file extension.

13. The non-transitory computer-readable medium according to claim 1, wherein a size of the alternative information is less than a size of the file.

14. A non-transitory computer-readable recording medium storing a program that causes a server to execute a method of synchronizing a file stored on the server to a client, the method comprising:
   receiving from the client a request to synchronize the file to the client, the request comprising a file synchronizing condition for determining whether the server is (1) to transfer the file or (2) to transfer alternative information instead of transferring the file, wherein the file synchronizing condition comprises at least one of a maximum size of the file, a type of the file, a creation date of the file, and an updated date of the file;
   determining, based on the at least one of the maximum size of the file, the type of the file, the creation date of the file, and the updated date of the file indicated by file synchronizing condition received in the request, whether the at least one of the maximum size of the file, the type of the file, the creation date of the file, and the updated date of the file satisfies the file synchronizing condition;
   determining whether the file in the request is stored at the client and that the server is (1) to transfer the file in response to determining that the at least one of the maximum size of the file, the type of the file, the creation date of the file, and the updated date of the file satisfies the file synchronizing condition, and determining to transfer the file to the client in response to determining that the file is stored at the client or (2) in response to determining that the file is not stored at the client to transfer the alternative information instead of transferring the file in response to determining the at least one of the maximum size of the file, the type of the file, the creation date of the file, and the updated date of the file does not satisfy the file synchronizing condition; and
   transferring to the client one of the file or the alternative information based on a result of the determining.

15. A non-transitory computer-readable recording medium storing a program that causes a client to execute a method of synchronizing a file stored on a server to the client, the method comprising:
   transmitting, by the client, to the server a request to transfer the file to the client, the request comprising a file synchronizing condition for determining whether the server is (1) to transfer the file or (2) to transfer alternative information instead of transferring the file, wherein the file synchronizing condition comprises at least one of a maximum size of the file, a type of the file, a creation date of the file, and an updated date of the file; and
   receiving one of (1) the file if it is determined by the server that the at least one of the maximum size of the file, the type of the file, the creation date of the file, and the updated date of the file satisfies the file synchronizing condition and if the server determines that the file in the request is not stored at the client, and receiving the file if it is determined by the server to transfer the file to the client if the server determines that the file in the request is stored at the client and (2) the alternative information in place of the file if it is determined by the server that the at least one of the maximum size of the file, the type of the file, the creation date of the file, and the updated date of the file does not satisfy the file synchronizing condition and if the server determines that the file in the request is not stored at the client.

16. A server comprising:
a processor; and
a memory that stores a file synchronizing program,
wherein the processor executes the file synchronizing program that controls the server to execute a method of synchronizing a file stored on the server to a client, the method comprising:
   receiving from the client a request to synchronize the file to the client, the request comprising a file synchronizing condition for determining whether the server is (1) to transfer the file or (2) to transfer alternative information instead of transferring the file, wherein the file synchronizing condition comprises at least one of a maximum size of the file, a type of the file, a creation date of the file, and an updated date of the file;
   determining, based on the at least one of the maximum size of the file, the type of the file, the creation date of the file, and the updated date of the file indicated by file synchronizing condition received in the request, whether the at least one of the maximum size of the file, the type of the file, the creation date of the file, and the updated date of the file satisfies the file synchronizing condition;
   determining whether the file in the request is stored at the client and that the server is (1) to transfer the file in response to determining that the at least one of the maximum size of the file, the type of the file, the creation date of the file, and the updated date of the file satisfies the file synchronizing condition, and determining to transfer the file to the client in response to determining that the file is stored at the client or (2) in response to determining that the file is not stored at the client to transfer the alternative information instead of transferring the file in response to determining the at least one of the maximum size of the file, the type of the file, the creation date of the file, and the updated date of the file does not satisfy the file synchronizing condition; and
   transferring to the client one of the file or the alternative information based on a result of the determining.

* * * * *